May 10, 1955　　　　W. H. SNOW　　　　2,708,131
END FITTING FOR RUBBER-LIKE STRAND
Filed Feb. 8, 1951

WILLIAM HERBERT SNOW,
INVENTOR.

BY *George V. Smyth*

ATTORNEY.

United States Patent Office 2,708,131
Patented May 10, 1955

2,708,131
END FITTING FOR RUBBER-LIKE STRAND

William Herbert Snow, Manhattan Beach, Calif.

Application February 8, 1951, Serial No. 209,997

8 Claims. (Cl. 287—82)

My invention relates to end fittings for elongated flexible members of rubber or like material. Such end fittings serve various attachment purposes. For example, an end fitting may be used to anchor one end of a flexible member, or to connect a handle to the member, or to couple the ends of two flexible members together. In all such uses the elongated member is placed under tensile strain and the function of the end fitting is to transmit corresponding tension force to or from the flexible member.

The problem is to provide a fitting that will maintain positive engagement with the end of the flexible member throughout a range of tension forces up to the rupture point of the material of the flexible member itself. It is desirable to meet this problem with an inexpensive end fitting that may be mounted on a flexible member in a simple and expeditious manner.

The invention depends for its success on the fact that rubber and other elastomers or rubber-like materials are as incompressible as fluids and have a certain limited capacity for flow as apparent in the ability of a piece of such material to assume various configurations under pressure without rupture. The underlying concept is that since the flow capacity of the material is limited, it is possible to confine or trap the end of the flexible member inside the fitting simply by providing a path of withdrawal that would require greater flow displacement on the part of the flexible member than its actual flow capacity permits.

Care in the design of the fitting is required to avoid any undesirable contribution on the part of the fitting to the tendency of the material to rupture. Sharp edges, sharp changes in direction, excessively restrictive coacting parts, and other design aspects that unduly concentrate strain anywhere in the material of the flexible member are to be avoided.

A feature of the invention is the confining of the elastic material in a smoothly contoured space of relatively great longitudinal extent with the cross-sectional area of the confining space diminishing relatively gradually in the direction of withdrawal of the material, the longitudinal extent and degree of reduction of the space being such as to require displacement greater than the actual flow capacity of the elastic material. With increasing tension force between the flexible member and the fitting, the confined material of the member initially tends to flow locally in the tapered passage up to its inherent limit of flow capacity and thereafter merely exerts increasing pressure against the passage walls without bodily movement relative to the walls.

Since an interior configuration for the end fitting that will positively prevent withdrawal of the end of the flexible member will also prevent insertion of the member, the present invention contemplates providing an initial configuration that will admit the member and then can be changed by deformation of the fitting to the desired final non-releasing configuration.

It is contemplated that the initial configuration will be relatively close to the final configuration or at least so close that only a minor deformation of the fitting is required to accomplish the final result. In practice this concept means that some flow displacement within the flow capacity of the material is required for insertion of the flexible member into the fitting and corresponding flow displacement would be required for withdrawal; but this required displacement is close enough to the critical point or limit of flow capacity of the enclosed material that only a simple change in configuration is required to shift the flow requirement to the other side of the critical point.

In the preferred practice of the invention these concepts are carried out by a pin and ferrule combination which will be described for the purpose of disclosure and illustration. It will be apparent to those skilled in the art, however, that the invention may be embodied in various ways and that various changes and departures may be made from my disclosure within the scope and spirit of the appended claims.

The pin extends longitudinally into the end of the elongated flexible member and the ferrule slips over the end of the flexible member, the pin and ferrule thus forming an annular space into which the end of the flexible member is inserted. The inner end of the ferrule is then reduced in diameter, preferably to a tapered configuration, by a suitable operation such as swaging, spinning, or crimping, thereby changing the configuration of the annular space to permanently confine the end material of the flexible member.

Preferably the end of the flexible member is provided with a longitudinal passage to receive the pin and thus avoid the necessity of using the pin to pierce its way into the material and an important advantage resides in this fact since the fitting is ideal for mounting on the ends of tubular members.

The above and other features and advantages of the invention will be apparent from the detailed description to follow taken with the accompanying drawings.

In the drawings, which are to be regarded as merely illustrative,

The flexible member to which the end fitting is attached may be made of any elastomer or rubber-like material that is substantially incompressible but has sufficient flow capacity for cooperation with the fitting in the manner indicated. The flexible member may also have different cross-sectional configurations including round, elliptical, polygonal and other configurations and it may be relatively wide or shaped like a strap if desired.

Figure 1:
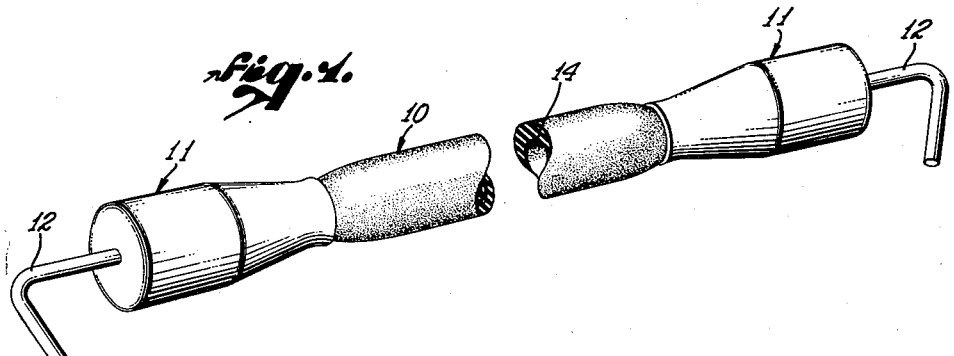
Figure 1 is a perspective view of a flexible member with its two ends equipped with fittings constructed in accord with my invention.

Figure 1 shows, by way of example, an elastic flexible member generally designated 10 in the form of a rubber strand or filament of circular cross-sectional configuration. Such a strand may be used as a link, sling, stabilizer, anchor, suspension means, etc. In this instance it is designed to serve as a quickly detachable means for use in an airplane to connect spaced points of a rubber fuel tank or bag to the surrounding aircraft structure.

Each of the end fittings, generally designated 11, in Figure 1, is designed to serve as a hook and, therefore, in the illustrated embodiment of the invention includes a hook-shaped fitting element 12. This fitting may be formed in any manner desired, however, depending on the particular use of the strand.

Preferably the flexible member or strand 10 is provided in advance with a suitable longitudinal passage or opening in each of the opposite ends thereof in preparation for mounting the fitting. In this instance it is not necessary to carry out a preparatory passage-forming operation because the flexible member 10 is manufactured in the form of a rubber tube having an axial passage 14.

Figure 2:
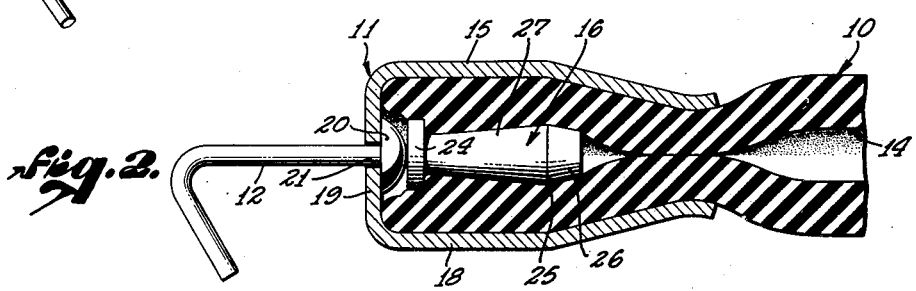
Figure 2 is an enlarged longitudinal section of the preferred embodiment of the pin fitting mounted on the end of a flexible tubular member.

The essential parts of the end fitting are a metal ferrule 15 for the direct transmission of tension forces to and from the flexible member 10, the previously mentioned hook-shaped fitting element 12 for the direct transmission of tension forces to and from the ferrule, and a suitable pin generally designated 16. These three parts may take various forms to serve their purposes and may be separate parts as shown in Figure 2 or any two or all three of the parts may be combined in a unitary structure.

The ferrule 15 may be shaped and adapted not only to serve its primary purpose of transmitting forces to and from the flexible member 10, but also to serve a function similar to the function of the fitting element 12. Thus the ferrule, for example, may be shaped and adapted to serve as a handle or as some connecting element such as a bayonet connector.

The ferrule 15, which may be stamped from sheet metal, has a cylindrical body 18 and preferably is formed with a transverse end wall 19. The hook-shaped fitting element 12 is shown in Figure 2 as a hook-shaped wire or rod formed with a head 20 on its inner end and is connected to the ferrule 15 simply by extending through a central aperture 21 in the end wall 19 of the ferrule with the head 20 abutting the inner surface of the end wall. Obviously such a fitting element may be attached to the ferrule in other ways.

The pin 16 preferably, but not necessarily, is formed with a head 24 which abuts the outer end of the flexible member 10 and serves to limit the movement of the pin into the passage 14 of the flexible member. The pin 16 may have a shank of uniform cross-section, but I now prefer to form the shank of the pin with an enlargement and I further prefer to taper this shank adjacent to the enlargement. In the construction shown, the enlargement 25 of the pin shank is at an intermediate longitudinal point of the pin, closer to its inner end than to its outer end, and the pin has a relatively short and relatively steep taper 26 towards its inner end and a longer more gradual taper 27 towards its outer end.

Preferably, as shown in Figure 2, the enlargement 25 of the pin shank is of greater cross-sectional dimension than the normal or undistorted diameter of the passage 14 in the flexible member 10, so that insertion of the pin into the passage causes distortion of the rubber tube with the rubber tending to flow in opposite directions from the pin enlargement; but the pin enlargement must not make it too difficult to slip the ferrule 11 over the end of the flexible member 10. It is desirable to expend energy to make the rubber flow into the annular space between the pin and the ferrule in the course of initial assembly of the end fitting because, in general, the more resistance that must be overcome in causing the rubber to flow past the enlargement of the pin in the course of inserting the end of the flexible member, the less deformation of the ferrule that will be subsequently required to prevent withdrawal of the flexible member from the fitting.

In this regard a feature of the present form of the invention is that it permits building up the withdrawal resistance in successive stages, so to speak, in the process of assembling the end fitting on the flexible member. This feature is based on inserting the pin 16 separately in advance of mounting the ferrule 15 on the end of the flexible member, as distinguished from making the pin integral with the ferrule for assembly movement simultaneously with the ferrule.

It is relatively easy to insert the pin 16 first into passage 14 of the flexible member 10 because in the absence of the ferrule 11 the outer diameter of the rubber tube is unrestrained. The pin is accommodated both by slight enlargement of the rubber tube and by slight flow of the rubber in both directions from the enlargement 25 of the pin. The subsequent movement of the ferrule 11 onto the end of the flexible member reduces this enlargement of the rubber tube and thus causes further flow of the rubber in both longitudinal directions from the pin enlargement 25.

In contrast, if the pin and ferrule were united for simultaneous movement into engagement with the end of the rubber tube, a greater total area of frictional resistance would be involved in this single movement than is the case here; greater frictional pressure would be exerted against both the surface of the pin and the surface of the ferrule; the enlargement of the pin shank would necessarily be reduced to make the insertion possible; and it would then be necessary to deform the ferrule more severely than is here necessary to confine the end of the rubber tube permanently inside the fitting.

The enlargement of the pin 16 to maximum diameter at the point 25 divides the annular space around the pin into two portions of progressively varying cross-sectional area, these two portions corresponding to the long taper 27 and the short taper 26. With respect to the direction of withdrawal of the end of the rubber tube arrangement provides a relatively long compression space along the taper 27 followed by an expansion space along the taper 26. It is the fact that the expansion space follows immediately after the throat or restriction formed by the enlargement 25 that would permit the end of the rubber tube to be withdrawn from the fitting prior to the constricting deformation of the ferrule 11.

When, as the final assembly step, the ferrule 11 is deformed at its inner end to the tapered configuration shown in Figure 2, the expansion space at the taper 26 of the pin is converted from an expansion space to a compression space, since now the cross-sectional area of the annular space at the inner end of the pin 16 is less than the cross-sectional area of the annular space at the point of enlargement 25 of the pin. Thus in the final form of the fitting, the annular space for the entire length of the pin 16 is progressively reduced in cross-sectional area in the direction of withdrawal of the rubber tube and the extent of flow displacement of the rubber required for the withdrawal of the end of the rubber tube through this long space of increasing compression is beyond the flow capacity of the rubber. For this reason the change in configuration of the annular space created by the tapering deformation of the ferrule 11 permanently anchors the end of the rubber tube in the fitting.

It will be noted that the free space in the passage 14 beyond the end of the pin 16 makes it possible for the portion of the ferrule 11 that extends beyond the pin 16 to constrict the flexible member 10 to the extent necessary for the required change in the configuration of the finished ferrule. The restrictive deformation of the ferrule in changing the space opposite the short taper 26 from an expansion space to a contraction space necessarily causes rubber to flow out of the space around the short taper and the portion of the passage 14 beyond the pin provides room for such flow.

The swaging or spinning operation causes the metal of the ferrule to flow smoothly to conform to the new restrictive configuration so that the final result is a smoothly finished ferrule. The metal ferrule can be deformed by crimping, if desired, and it is also to be noted that a ferrule fabricated from a thermo-responsive plastic may be deformed in the desired manner by the application of heat and pressure.

In the finished fitting the ferrule 11 together with the end of the flexible member 10 completely encloses the head 20 of the hook-shaped fitting element 12 as well as the head 24 of the pin 16 and the ferrule prevents retraction of the pin from the passage 14.

Figure 3:
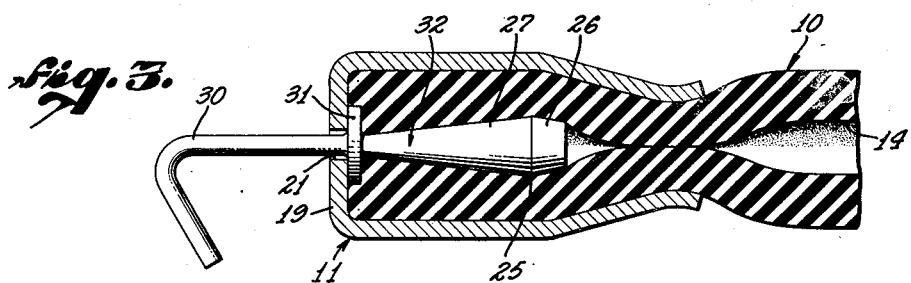
Figures 3 and 4 are similar views of modified forms of the fitting.
Figure 4:
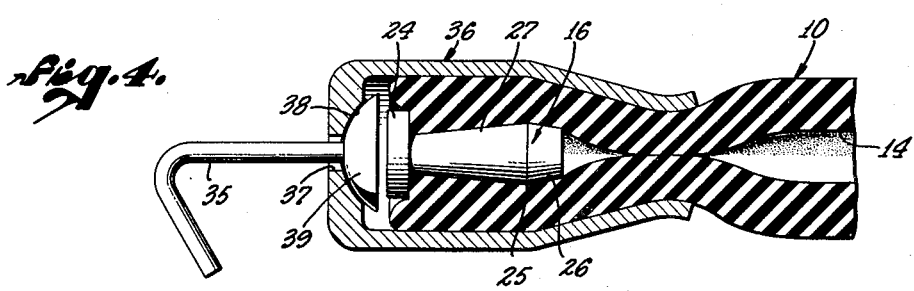

The constructions of the two modified forms of the end fitting shown in Figures 3 and 4 are largely similar to the described construction in Figure 3 as indicated by the use of corresponding numerals to indicate corresponding parts.

In the embodiment of the invention shown in Figure 3, the hook-shaped fitting element and the pin may be united in one integral construction. The hook 30 in Figure 3 is integral with a radial flange 31 that replaces the heads 20 and 24 of Figure 2, and this radial flange 31 is, in turn, integral with a shank 32 that corresponds to the pin 16 of Figure 2.

Figure 4 differs from Figure 2 in providing a hook 35 that has a swivel connection with a ferrule 36. The end wall of the ferrule 36 has a relatively large aperture 37 to permit the desired freedom for movement on the part of the hook 35 and is formed with a spherical seat 38 surrounding the aperture to serve as a socket for a spherical head 39 on the inner end of the hook 35. In other respects the end fitting of Figure 4 is of the same construction as heretofore described.

I claim:

1. A connector of the character described, comprising: an elongate member of elastic material; a pin of rigid material coaxially embedded in an end of the elongated member; a ferrule having a transverse end wall closing the outer end thereof and of a length greater than said pin telescopically mounted on and compressively enclosing the said end of the member for the transmission of forces to stress said member in tension, said pin and the inner wall of the ferrule forming an annular space flow displacing the material of the enclosed end within the capacity of the material of the member, said ferrule having the innermost portion thereof progressively reduced toward its inner end to reduce the cross-sectional area of said space in the direction of withdrawal of the member to require greater flow displacement for escape of the material than within the flow capacity of the material, thereby permanently confining the end of the member within said ferrule; a mounting element, including a shank member projecting through an opening formed in said end wall; and enlarged means carried by the inner end of said shank member and engaged with the inner side of said end wall for transmitting tension forces into said ferrule.

2. A connector of the character described, comprising: an elongate member of elastic material; a pin of rigid material coaxially anchored in an end of the member; a ferrule having an end wall closing the one end thereof and of a length greater than said pin compressively sleeving the said end of the member for the transmission of forces to stress said member in tension, the inner end portion of said ferrule being progressively reduced in cross-section to form a restricted opening at the inner end thereof of a cross-sectional dimension less than the irreduceable cross-sectional dimension of the enclosed material deformed to its elastic limit by forces transmitted to the member tending to withdraw said enclosed end from said ferrule, whereby said ferrule is held against separation from said member; an attaching element having a shank passed through an opening formed in the end wall of said ferrule; and means carried by said shank inter-engaging with the inner side of said end wall for holding said shank against withdrawal from said ferrule and for transmitting tension forces induced into said attaching element to said ferrule.

3. A connector of the character described, comprising: an elongate hollow member of elastic material; a pin embedded in an end of the elongated member longitudinally thereof; a ferrule, of a length greater than said pin, and having a transverse wall closing the one end thereof telescopically mounted on the said end of the member for the transmission of forces between the ferrule and the member, said pin and ferrule forming an annular space requiring flow displacement within the capacity of the material of the member for admission of the end of the member into the space, the inner end portion of said ferrule being progressively reduced to reduce the cross-sectional area of said space in the direction of withdrawal of the member, said ferrule having at the inner end thereof a restricted opening of such a cross-sectional dimension as to require flow displacement for escape therethrough of the material and embedded pin than within the flow capacity of the material, thereby permanently confining the end of the member within said ferrule; and a fitting element projecting through an opening formed in the transverse wall of said ferrule and including means interengaged with the inner side of said transverse wall for transmitting forces to said ferrule.

4. A connector of the character described, comprising: an elongate member of elastic material; a pin coaxially anchored in an end of the member; a ferrule of a length greater than said pin compressively sleeving the said end of the member for the transmission of tensile forces to said member, said ferrule having a transversely extending end closing wall at the outer end thereof and having the inner end portion progressively reduced in cross-section to form a restricted opening at the inner end thereof of a cross-sectional dimension less than the irreduceable cross-sectional dimension of the enclosed material deformed to its elastic limit by forces transmitted to the member tending to withdraw said enclosed end from said ferrule thereby holding said ferrule against separation from said member; and a fitting having a shank and a hook at the outer end of said shank, said shank projecting through an opening formed in said end closing wall, said shank having means interengaged with the inner side of said wall for transmitting tensile forces to said ferrule.

5. A connector as set forth in claim 1 in which at least a portion of said pin tapers toward its outer end to make the corresponding portion of said annular space progressively diminish in cross-sectional area in the opposite direction.

6. A connector as set forth in claim 3 in which the fitting element and the pin are integral.

7. A connector as set forth in claim 2 in which said pin has an enlarged portion and tapers both directions from said enlarged portion.

8. A connector as set forth in claim 3 in which said pin has a head engaged with the end wall of said hollow member to limit movement of said pin inwardly of said hollow member.

References Cited in the file of this patent

UNITED STATES PATENTS

| 22,441 | Mayall | Dec. 28, 1858 |
| 1,204,887 | La Fleur | Nov. 11, 1916 |
| 2,060,864 | Hedler | Nov. 17, 1936 |
| 2,085,320 | Kolstrand | June 29, 1937 |
| 2,099,950 | Whitehead et al. | Nov. 23, 1937 |
| 2,239,026 | Wagner | Apr. 22, 1941 |
| 2,299,160 | MacPherson | Oct. 20, 1942 |
| 2,411,079 | Paule | Nov. 12, 1946 |

FOREIGN PATENTS

| 384,668 | Germany | Nov. 10, 1923 |
| 894,454 | France | Mar. 13, 1944 |